July 19, 1960  C. C. WOODWARD ET AL  2,945,654
PILOT AND EJECTION SEAT ENERGY ABSORPTION SYSTEM
Filed May 14, 1957  3 Sheets-Sheet 1
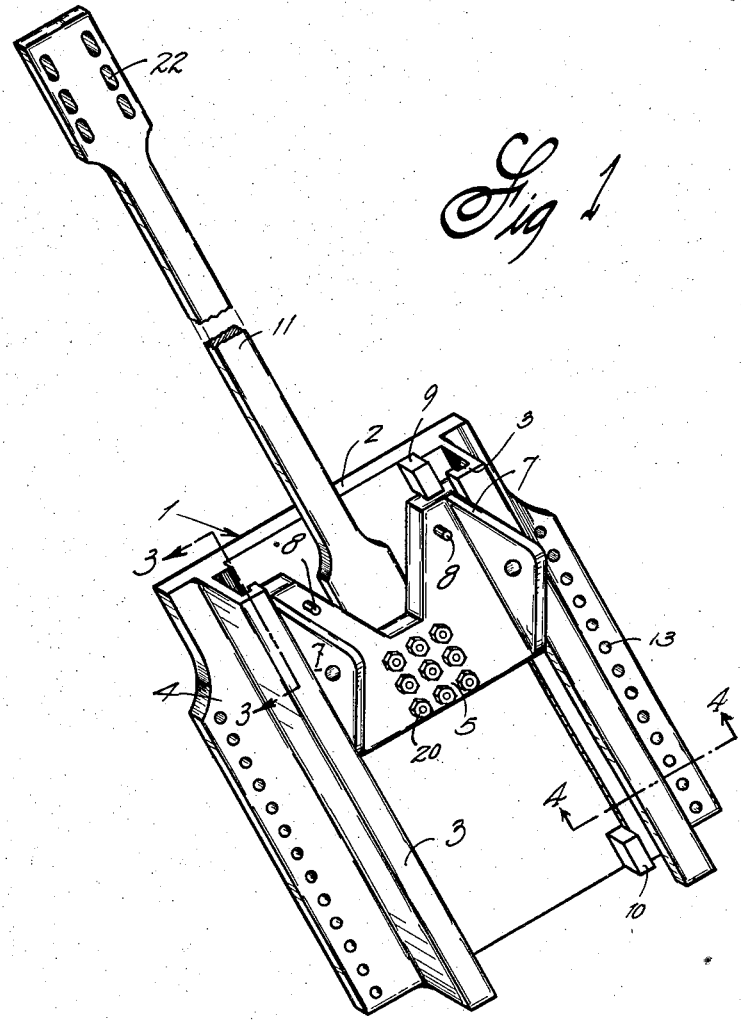
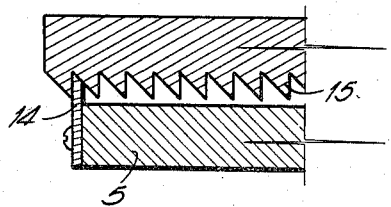
INVENTOR.
CLIFFORD C. WOODWARD
CHRIS T. KOOCHEMBERE
BY
H. H. ——
ATTORNEYS July 19, 1960  C. C. WOODWARD ET AL  2,945,654
PILOT AND EJECTION SEAT ENERGY ABSORPTION SYSTEM
Filed May 14, 1957  3 Sheets-Sheet 2

INVENTOR.
CLIFFORD C. WOODWARD
CHRIS T. KOOCHEMBERE
BY

*H. H. Cunningham*
ATTORNEYS

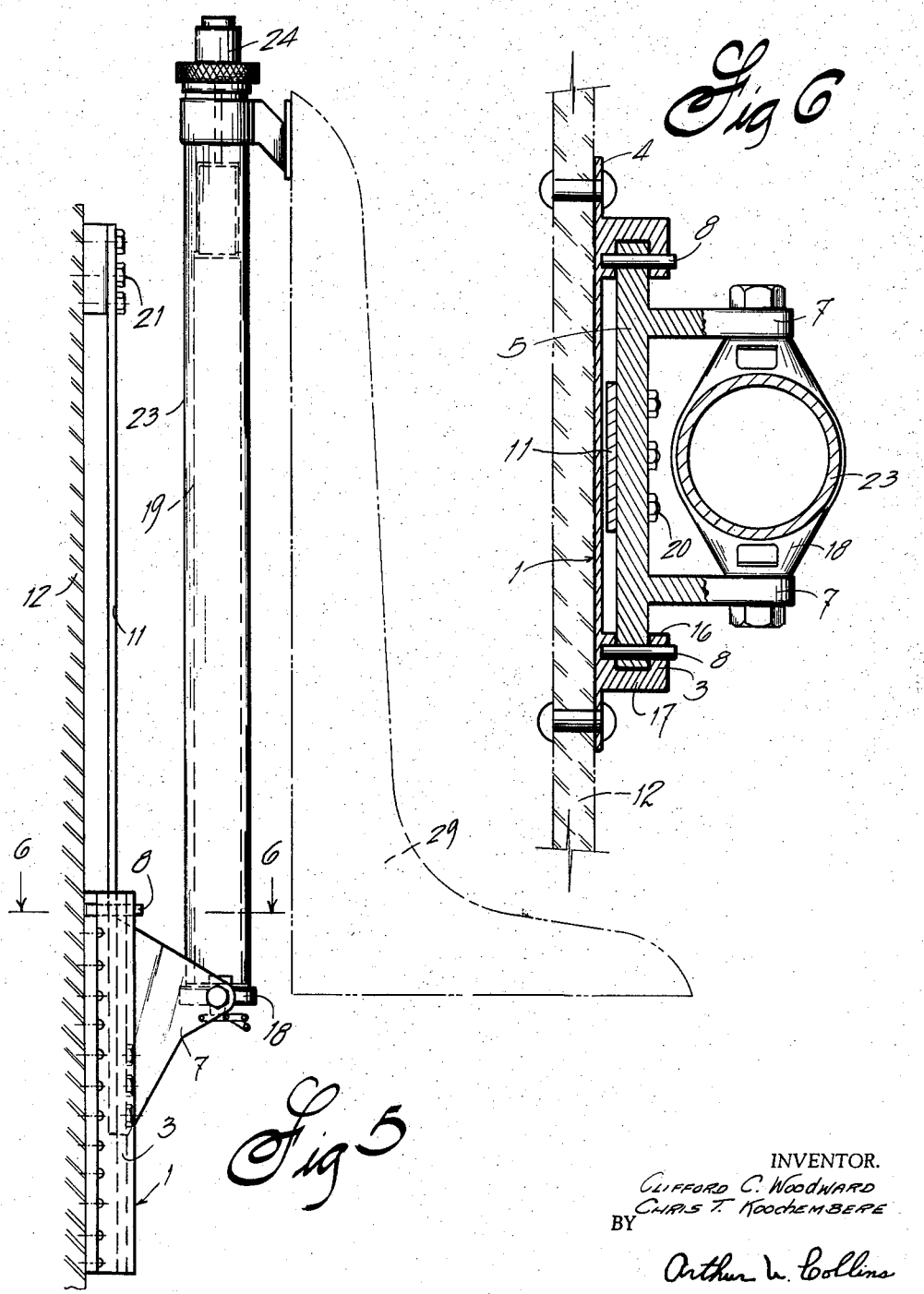

United States Patent Office 2,945,654
Patented July 19, 1960

2,945,654
PILOT AND EJECTION SEAT ENERGY ABSORPTION SYSTEM

Clifford C. Woodward, 7 Rampart W., Media, Pa., and Chris T. Koochembere, 414 E. Winona Ave., Norwood, Pa.

Filed May 14, 1957, Ser. No. 659,189

4 Claims. (Cl. 244—122)

(Granted under Title 35, U.S. Code (1952), sec. 266)

The invention described herein may be manufactured and used by or for the Government of the United States of America for governmental purposes without the payment of any royalties thereon or therefor.

This invention relates to a device for reducing the high vertical and horizontal "G's" on an ejection seat of an aircraft during a crash or sudden stop.

The object of this invention therefore is a safety device for use with an aircraft ejection seat.

Another object of this invention is a device to reduce the high "G's" on an ejection seat during a sudden stop and thus to eliminate serious injury to a seat occupant during such stop.

Still a further object of this invention is a device which reduces the high "G's" present during an abnormal ejection of an ejection seat.

Figure 2:
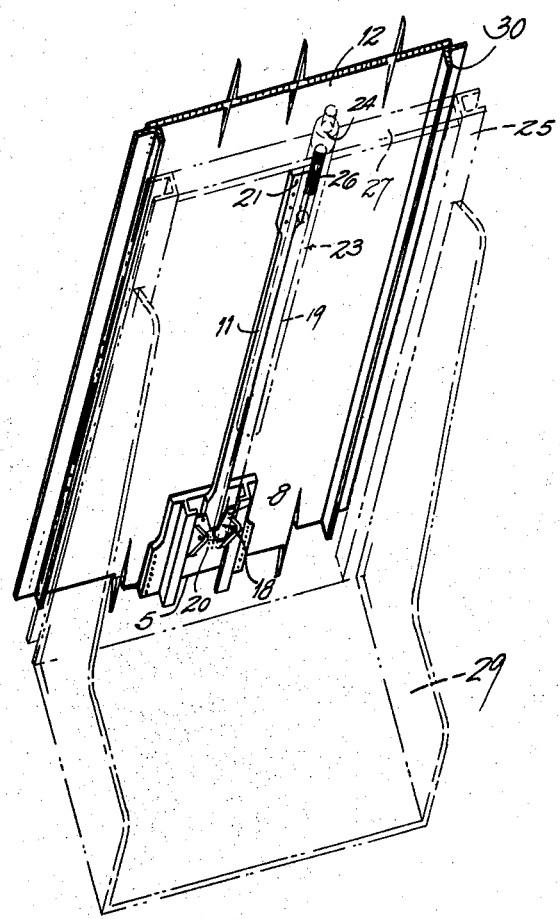
Figure 4:
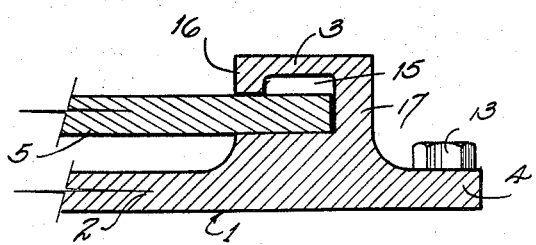

These and other objects will be readily apparent to those skilled in the art by a reading of the following description and an examination of the attached drawing wherein:

Figure 1 is an isometric view of the instant invention,

Figure 2 is an isometric view of the invention with relation to the ejection seat, Figure 3 is a cross-sectional view along sectional lines 3—3 of Figure 1, Figure 4 is a cross-sectional view along sectional lines 4—4 of Figure 1, Figure 5 is a side elevation of an ejection seat illustrating the invention, and Figure 6 is a cross-section taken on the line 6—6 of Figure 5.

Referring to Figure 1, a track support 1 comprises a base plate 2 having its lateral edges 4 secured to bulkhead 12 of the aircraft. A plurality of bolts 13 secures the edges 4 to the bulkhead. Adjacent each lateral edge 4 is an inverted L section 3 (Figure 4) with the leg of the L having a depending portion 16 extending therefrom. Within the space enclosed by the upright portion 17 of the L 3 and the opposite depending section 16 are a plurality of ratchet teeth 15 (Figures 3 and 4). A spring steel stop member 14 rides along said rack 15 and is secured at one end to slide 5.

The slide is comprised of an aluminum alloy forging and extends from one upright leg 17 to the other upright leg; the slide also has a loose fit between lip 16 and base section 2 thereby allowing the slide to move vertically when unrestricted. Stops 9 and 10 secured to base section 2 limit the upward and downward travel of the slide. Extending from the slide 5 are a pair of ears 7 swivably supporting between them the lower trunnion cap 18 of the personnel ejector catapult (Figure 2); attached to the cap 18 is an ejection tube 19.

Secured to the slide by a plurality of bolts 20 is one end of a steel strap 11; the opposite end of the strap is secrued to the vertical bulkhead 12 by a plurality of bolts 21 which bolts extend through elongated holes 22 in the strap. The strap 11, which comprises the energy absorber, is a fully annealed stainless steel strap of 95,000 p.s.i. ultimate design stress and of a thickness of approximately $\frac{1}{16}$ inch. A pair of shear pins 8 secure the slide to the track support 1 to prevent loading the strap with forces other than those of predetermined value. The use of release means, such as the shear pins 8, avoids a gradual, premature elongation of the strap 11 as would result from the application of a small force for a number of times, since the strap is non-resilient metal, and conserves the strap's full effectiveness for large harmful forces.

On either side of the slide assembly are mounted a plurality of rollers (not shown) mounted to flanges 30 and secured to the bulkhead 12. These rollers provide support means and guide means for the ejection seat extension 25 during an ejection.

The ejection seat 29 (Figure 2) has secured on its backside a fitting 27 which secures thereto the outer tube 23 of the ejector catapult. The seat tube is of a larger internal diameter than the external diameter of the bulkhead tube 19 so that tube 23 slideably fits over tube 19. Within the inner tube 19 is an ejection cartridge 26 which when fired by a firing pin 24 generates pressure gases to separate the two tubes and of course eject the seat upward.

The operation of the device is as follows: During a crash or sudden stop, the body in the seat is subjected to a high "G" force forward and downward. Due to the human body's spinal configuration, it cannot withstand much of a "G" force in a downward direction. Thus, the safety mechanism of this invention absorbs a large portion of this force. When such a force is created, pins 8 are sheared. The seat via the tubes 23 and 19 forces the slide 5 downward and stretches the steel strap 11. The strap, of course, absorbs the energy of the downward force of this impact thus saving the seat occupant from possible injury to his spinal column. The design of the strap would obviously change in different installations; however, in the specific design used it has been discovered by tests that the strap will elongate as much as 4 inches.

The safety device also assists in attaining a proper ejection. Referring to Figure 2, a normal ejection has sleeve 23 catapulted from tube 19 by the pressure of the gases generated by charge 26. The seat 29 attached to sleeve 23 is ejected upward with the sleeve, with guide member 25 riding on the rollers (not shown).

During an ejection at high temperatures, excessive pressure is generated by the charge 26 and the rate of ejection is excessively high. With the instant safety device, a portion of the excessive force is absorbed by the strap with the strap elongating as before. The ejection rate by this absorption of energy is kept within design limits.

While the instant invention is shown as being used to absorb the downward component of impact force, it is obvious that the slide and strap can also be used to partially absorb the horizontal component. Thus, it is evident that a dual arrangement can be had, one system to absorb the vertical force, another system to absorb the horizontal force.

Obviously many modifications and variations of the present invention are possible in the light of the above teachings. Thus, although the instant application pertains to the use of the absorber on an ejection seat, the absorber may be utilized on other seat applications such as passenger seats on aircraft, automobile seats, and other vehicles used for transportation. At the same time, the strap, per se, could be made from other materials beside stainless steel; the only requirement, of course, is that the substituted material behave similar to the steel described herein. In addition, the particular configuration of the strap is of secondary importance; it is understood that the strap cross-sectional configuration may be changed, as for example, by making the strap in rod or tubular form. Such various configurations are deemed to be the full equivalents of applicants' strap, per se, as long as they meet the basic requirements noted herein.

What is claimed is:

1. The combination of a seat, a support, a track secured to said support; a slide moveable in said track, seat ejection means mounted on said slide and secured to said seat by which a vertical upward force may be applied to said seat for ejection thereof, an elongatable, non-resilient energy absorbing, metallic strap fixed at one end to said support and at its other end to said slide so that impact loads applied to said strap by said ejection means will be absorbed by elongation thereof.

2. The device of claim 1 wherein said strap is annealed stainless steel.

3. The device of claim 2 including a row of ratchet teeth extending the length of said track and a stop means mounted on said slide adapted to engage said ratchet teeth with movement of said slide in said track under tension forces on said strap and to prevent return of said slide under forces tending to compress said strap.

4. The device of claim 3 including release means immovably securing said slide to said track member for predetermined forces.

References Cited in the file of this patent

UNITED STATES PATENTS

| 118,919 | Foote | Sept. 12, 1871 |
| 2,035,367 | Gibson | Mar. 24, 1936 |
| 2,629,427 | McIntyre | Feb. 24, 1953 |
| 2,637,368 | Cotton | May 5, 1953 |
| 2,682,931 | Young | July 6, 1954 |

FOREIGN PATENTS

| 74,375 | Netherlands | Apr. 15, 1954 |
| 185,403 | Germany | Apr. 25, 1956 |
| 752,017 | Great Britain | July 4, 1956 |